United States Patent
Hyrsyla et al.

(10) Patent No.: US 9,864,733 B2
(45) Date of Patent: Jan. 9, 2018

(54) METHOD, A SYSTEM AND A COMPUTER PROGRAM FOR GENERATING VIEWABLE PRESENTATIONS

(71) Applicant: M-Files Oy, Tampere (FI)

(72) Inventors: Timo Hyrsyla, Tampere (FI); Lassi Pohjoisvirta, Tampere (FI); Kristian Virmo, Helsinki (FI); Joel Heinrich, Vantaa (FI)

(73) Assignee: M-FILES OY, Tampere (FI)

( * ) Notice: Subject to any disclaimer, the term of this patent is extended or adjusted under 35 U.S.C. 154(b) by 272 days.

(21) Appl. No.: 14/560,059

(22) Filed: Dec. 4, 2014

(65) Prior Publication Data

US 2016/0162443 A1 Jun. 9, 2016

(51) Int. Cl.
| | |
|---|---|
| G06F 17/00 | (2006.01) |
| G06F 17/21 | (2006.01) |
| G06F 17/24 | (2006.01) |
| G06F 17/30 | (2006.01) |
| G06F 17/22 | (2006.01) |

(52) U.S. Cl.
CPC .......... *G06F 17/212* (2013.01); *G06F 17/211* (2013.01); *G06F 17/248* (2013.01); *G06F 17/30011* (2013.01); *G06F 17/21* (2013.01); *G06F 17/2288* (2013.01); *G06F 17/24* (2013.01); *G06F 17/30896* (2013.01)

(58) Field of Classification Search
CPC ............. G06F 17/212; G06F 17/30011; G06F 17/248; G06F 17/21; G06F 17/24
See application file for complete search history.

(56) References Cited

U.S. PATENT DOCUMENTS

| | | | | |
|---|---|---|---|---|
| 7,734,995 B1* | 6/2010 | Saikaly | ................. | G06F 17/248 |
| | | | | 715/200 |
| 8,538,980 B1* | 9/2013 | MacKenzie | ....... | G06F 17/30011 |
| | | | | 707/769 |
| 8,819,068 B1* | 8/2014 | Knote | ............... | G06F 17/30339 |
| | | | | 707/790 |
| 9,053,190 B1* | 6/2015 | Boenau | ............. | G06F 17/30867 |
| 2002/0152244 A1* | 10/2002 | Dean | .................... | G06F 17/2247 |
| | | | | 715/255 |
| 2006/0031479 A1* | 2/2006 | Rode | ....................... | H04L 67/34 |
| | | | | 709/224 |
| 2007/0038812 A1* | 2/2007 | Miller | ............... | G06F 17/30902 |
| | | | | 711/133 |
| 2007/0203935 A1* | 8/2007 | de Souza | ................ | G06Q 10/10 |
| 2007/0282693 A1* | 12/2007 | Staib | ..................... | G06Q 30/02 |
| | | | | 705/26.5 |

(Continued)

*Primary Examiner* — Cesar Paula
*Assistant Examiner* — David Faber
(74) *Attorney, Agent, or Firm* — Ware, Fressola, Maguire & Barber LLP

(57) ABSTRACT

The invention relates to a method for generating a presentation from a metadata only, or from a metadata and a document file. A content management system stores electronic data as electronic objects, wherein an electronic object is associated with metadata having one or more properties and corresponding values. The method in such a system comprises determining a presentation template for an electronic object; modifying at least one section of the presentation template with a property value obtained by utilizing metadata of the object; and generating a metadata presentation of the modified presentation template.

17 Claims, 9 Drawing Sheets

(56) References Cited

U.S. PATENT DOCUMENTS

| | | | |
|---|---|---|---|
| 2008/0104493 A1* | 5/2008 | Rees | G06F 17/248 |
| | | | 715/200 |
| 2008/0163043 A1* | 7/2008 | van Eikeren | G06F 17/248 |
| | | | 715/255 |
| 2008/0263467 A1* | 10/2008 | Wilkins | G06F 9/4443 |
| | | | 715/765 |
| 2008/0288337 A1* | 11/2008 | Snyder | G06Q 30/02 |
| | | | 705/14.46 |
| 2014/0006345 A1* | 1/2014 | Laitkorpi | G06F 3/0647 |
| | | | 707/610 |
| 2015/0067797 A1* | 3/2015 | Tejerina | H04L 63/0823 |
| | | | 726/6 |

* cited by examiner

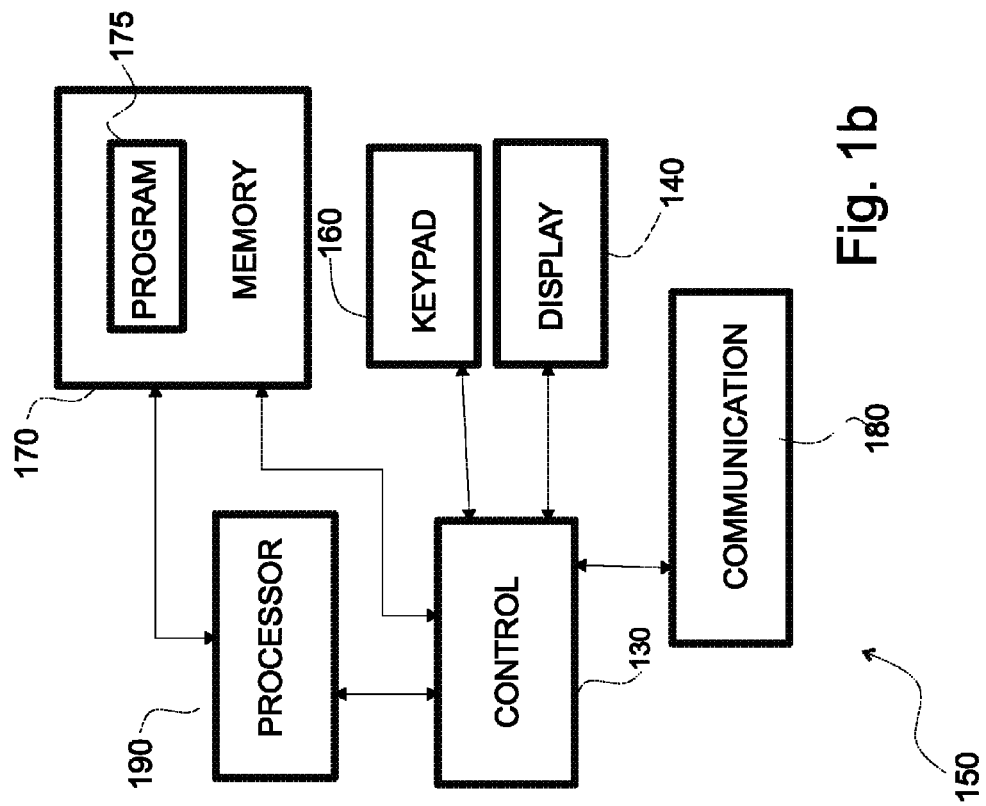
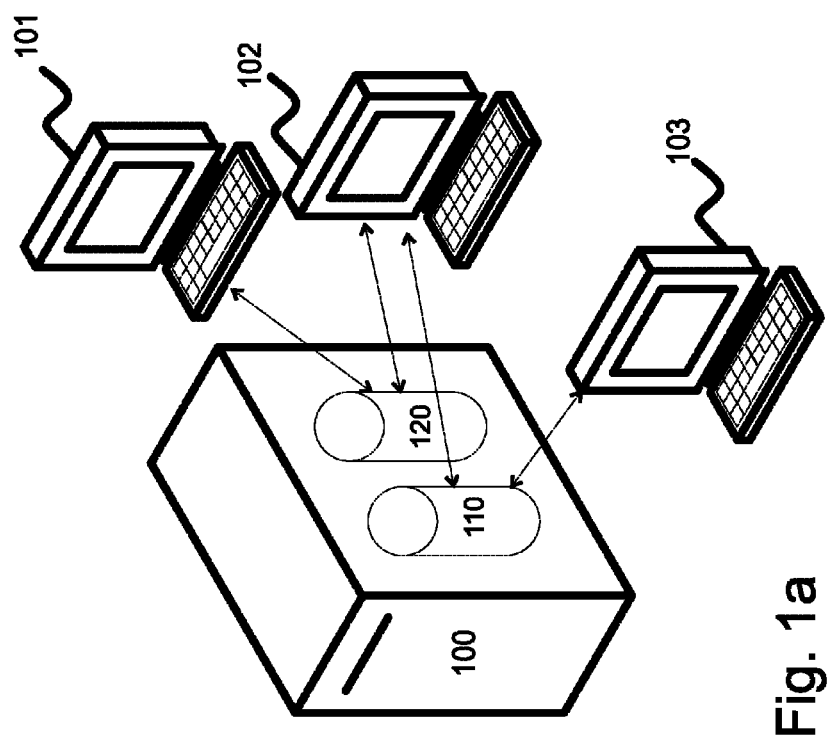

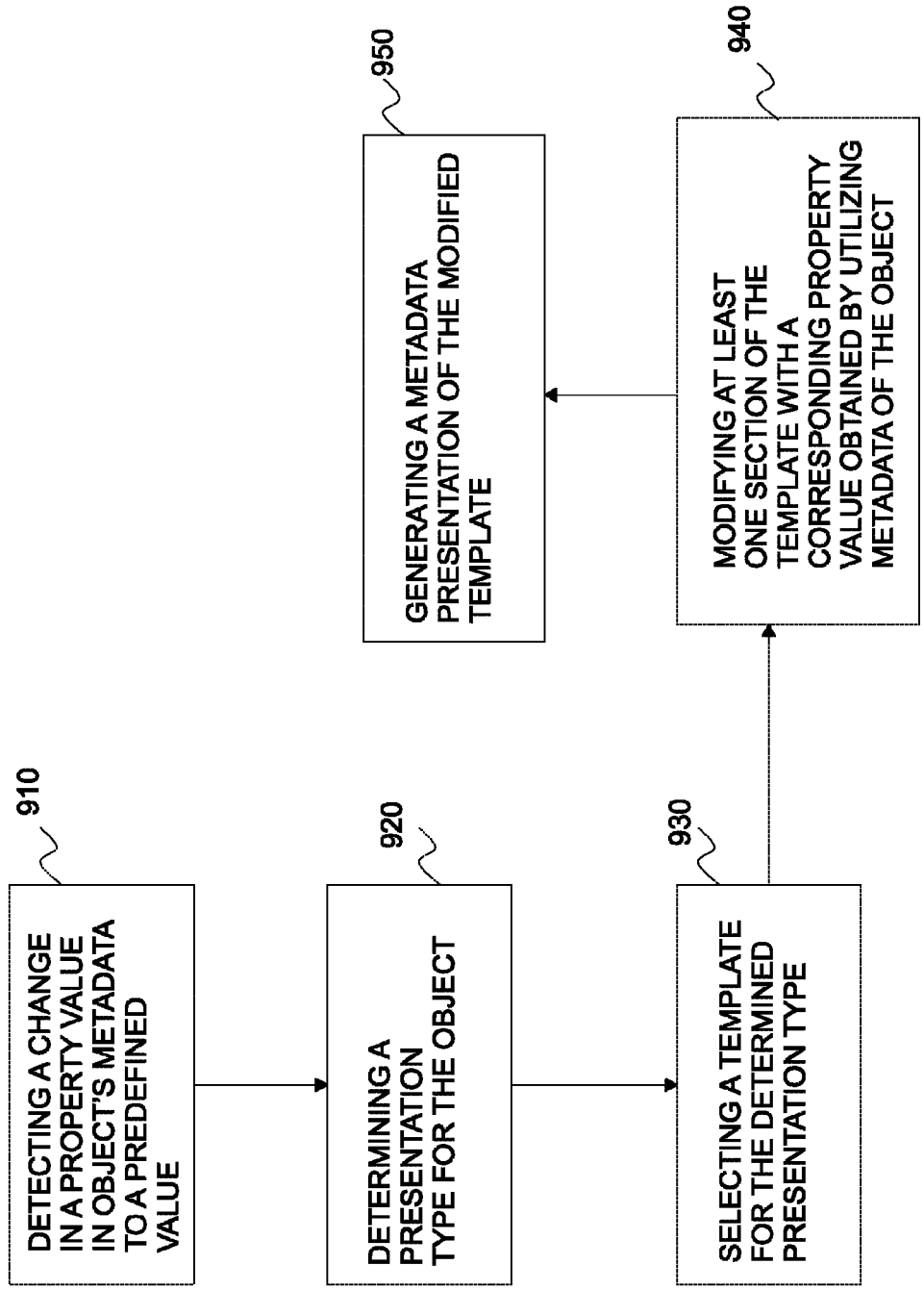

METHOD, A SYSTEM AND A COMPUTER PROGRAM FOR GENERATING VIEWABLE PRESENTATIONS

TECHNICAL FIELD

The present application relates to a content management system. In particular, the present application discloses a method for generating viewable presentations.

BACKGROUND

Enterprise Content Management (ECM) system refers to a system organizing and storing organization's electronic documents and other business-related objects and/or content. ECM system may comprise content management systems (CMS), document management systems (DMS) and data management systems. Such systems comprise various features for managing electronic documents, e.g. storing, versioning, indexing, searching for and retrieval of documents. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

SUMMARY

Now there has been invented an improved method and technical equipment implementing the method. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method for a content management system storing electronic data as electronic objects, wherein an electronic object is associated with metadata having one or more properties and corresponding values. The method comprises determining a presentation template for an electronic object; modifying at least one section of the presentation template with a property value obtained by utilizing metadata of the object; and generating a metadata presentation of the modified presentation template.

According to a second aspect, there is provided an apparatus comprising at least one processor, memory including computer program code, the memory and the computer program code configured to, with the at least one processor, cause the apparatus to perform at least the following: determining a presentation template for an electronic object; modifying at least one section of the presentation template with a property value obtained by utilizing metadata of the object; and generating a metadata presentation of the modified presentation template.

According to a third aspect, there is provided a computer program product embodied on a non-transitory computer readable medium, comprising computer program code configured to, when executed on at least one processor, cause an apparatus or a system to: determine a presentation template for an electronic object; modify at least one section of the presentation template with a property value obtained by utilizing metadata of the object; and generate a metadata presentation of the modified presentation template.

According to an embodiment, a change in a property value in the object's metadata to a predefined value is detected.

According to an embodiment, the property having the predefined value is a workflow state.

According to an embodiment, the method is executed as a response to the detection of the change of the property value.

According to an embodiment, the presentation template is determined from a metadata property of the object.

According to an embodiment, the presentation template is determined from a property value of an object that is referred by a property value of the object.

According to an embodiment, the object comprises a document file.

According to an embodiment, a content presentation of the content of the document file is generated.

According to an embodiment, the content presentation and the metadata presentation are combined to generate a final presentation for the object.

According to an embodiment, the metadata of the object is utilized for obtaining a property value directly from said object's metadata, and modifying a section of the presentation template with the obtained property value.

According to an embodiment, the metadata of the object is utilized for obtaining a property value from metadata of an object that is referred by a property value of the object, and modifying a section of the presentation template with the obtained property value.

According to an embodiment, the metadata of the object is utilized for obtaining more than one property values directly from said object's metadata, and modifying several sections of the presentation template with the obtained property values.

According to an embodiment, the metadata of the object is utilized for obtaining property values from metadata of more than one object that are referred by a property value of the object, and modifying several sections of the presentation template with the obtained property values.

DESCRIPTION OF THE DRAWINGS

In the following, various embodiments of the invention will be described in more detail with reference to the appended drawings, in which FIG. 1a shows a content management system according to an embodiment;

FIG. 1b shows an apparatus according to an embodiment;

FIG. 9 shows a flowchart of a method according to an embodiment.

DESCRIPTION OF EXAMPLE EMBODIMENTS

Figure 2:
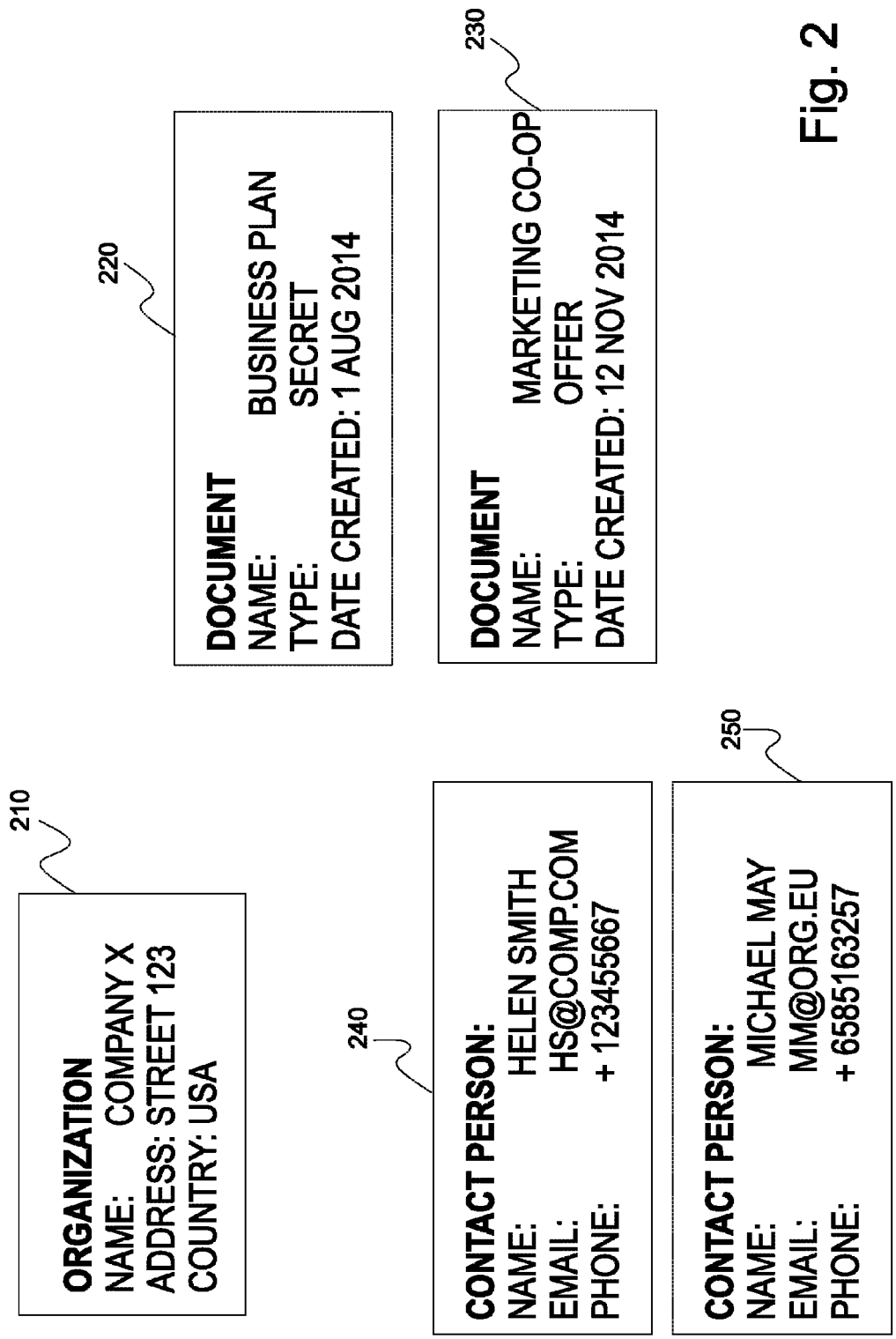
FIG. 2 shows examples of objects in a content management system.

In the following, several embodiments of the invention will be described in the context of enterprise content management system. It is to be noted, however, that the invention is not limited to enterprise content management systems.

Data management system, such as enterprise content management systems (ECM), for example, a quality management system (QMS), a document management system (DMS), a customer relationship management system (CRM), can store data either statically or dynamically. The present embodiments relate to a dynamic system.

FIG. 1 illustrates an enterprise content management system according to an embodiment. The system comprises at least one server 100 for storing electronic objects. The server may be a so called on-premise server or a cloud server or their combination. The electronic objects may be stored in one or more data vaults 110, 120. One or more client devices 101, 102, 103 can access said at least one server 100 in order to work with the stored electronic objects. For example, a client device may check-out an object, wherein a user of the client device may modify the checked-out object. After modification, the user of the client device checks the object in the vault again, wherein the object is available to other users. The client device may be a personal computer, a mobile device, a laptop, a tablet device, or any computer device. The content stored in the server is used through an application, wherein the application may be universal for all types of client devices, or there can be client device specific content management application for each device, e.g. a mobile application, a web-based application, a native application. In addition, the server device 100 may have its own server application.

An apparatus according to an embodiment is illustrated in FIG. 1b in simplified manner. The apparatus 150 may represent a server device 100 or client device 101, 102, 103 of FIG. 1a. The apparatus 150 comprises processing means, such as a processor 190 for processing data. The apparatus 150 further comprises memory means, such as a memory 170, storing computer program code 175, applications and various electronic data. The apparatus 150 comprises controlling means, such as a control unit 130, for controlling functions in the apparatus 150. The control unit 130 may run a user interface software to facilitate user control of at least some functions of the apparatus 150. The control unit 130 may also deliver a display command and a switch command to a display 140 to display visual information, e.g. a user interface. The control unit 130 may communicate with the processor 190 and can access the memory 170. Further, the apparatus 150 may comprise input means e.g. in a form of a keypad 160. Yet further, the apparatus 150 comprises various data transfer means, such as a communication block 180 having a transmitter and a receiver for connecting to a network and for sending and receiving information. The communication means can be adapted for telecommunications and/or wide-range and/or short range communication.

An object in a dynamic content management system, is a representation of any data. The object may have relationship with (i.e. refers to/are referred by) other objects. The dynamic data management system has a metadata structure that defines the semantics for the data. The metadata structure defines metadata for different objects as well as relationships between objects.

FIG. 2 illustrates examples of objects. An example of an object is an organization 210, having properties (i.e. metadata) for a name; an address; a country. An example of another object is a document 220, 230, having properties (i.e. metadata) for a type; a name; a date created. An example of yet another object is a contact person 240, 250, having properties (i.e. metadata) for a person name; an email address; a phone number. The values for the metadata properties can be defined manually by typing a value (e.g. HS@COMP.COM in object 240) to a value field. Alternatively, the property can be a look-up type, which means that possible values for the property can be selected from a predefined list of values. For example, a document object 220 comprises a look-up type property "type" having a value "secret". The value "secret" has been selected from a list of values (not show in FIG. 2) comprising—for example— values "Published", "Secret", "Offer", "Agreement". In addition to metadata, the objects may contain a content file. For example, a document object 220, 230 may in addition contain a file that has been created with a certain application, such as an application from Microsoft Office, Notepad, OpenOffice, and stored in a corresponding file format.

Figure 3:
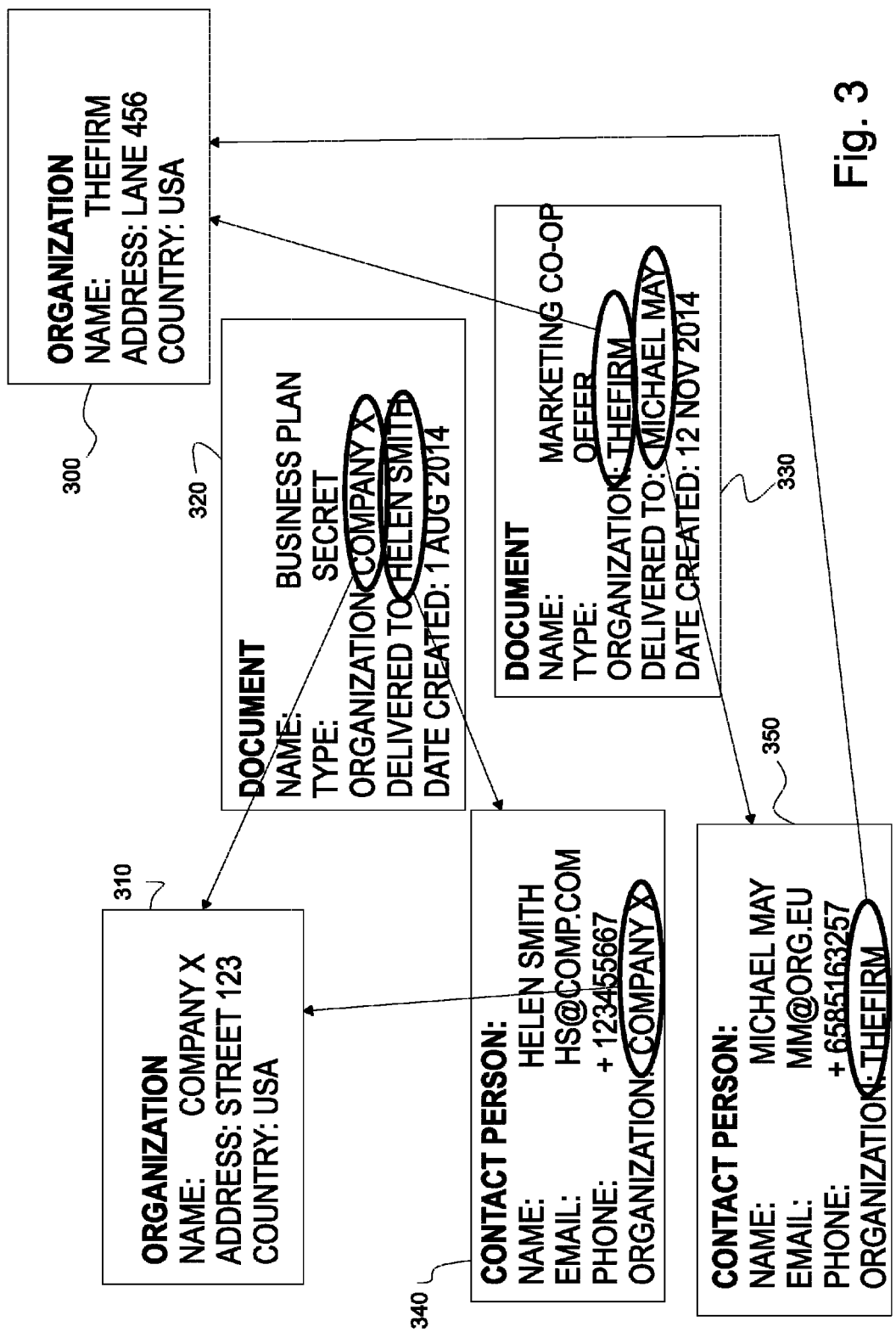
FIG. 3 shows examples of objects in a content management system and their reference to other objects.

The relationships for the objects can be created by defining metadata references between objects. FIG. 3 illustrates an example of how relationships between objects can be defined. It is realized that objects shown in FIG. 2 are defined with further metadata. For example, the metadata of a document 320, 330 is complemented with metadata properties "Organization" and "Delivered to". Similarly, the metadata for a contact person 340, 350 is complemented with metadata property "Organization". It is the value of these metadata properties which define the other object to which the relationship is generated. For example, a document object 320 refers to an organization object 310 via metadata "Organization" whose value is Company X. Similarly, a document object 330 refers to an organization object 300 via metadata "Organization" whose value is Thefirm. Document objects 320, 330 also refer to objects "contact person" 340, 350 respectively via metadata "Delivered to" whose value is either Helen Smith or Michael May. Similarly, objects for contact person 340, 350 has a reference to organization objects 310, 300 via corresponding metadata values. It is appreciated that by changing any of the metadata values that are used as a reference to another object, the reference will be changed accordingly. For example, if a value for Organization property for Helen Smith as a contact person object 340 was changed to be Thefirm, then the contact person object Helen Smith would refer to Organization object 300 instead of Organization object 310. It is appreciated that references can be simply defined by selecting a value from a predefined list of values for a look-up type property. In such case, the relationship will be correct.

As mentioned, in a dynamic content management system, any data can be represented as objects. This means that also any configuration data or functions may be represented as objects, and may also be processed as objects which can be referred by other objects.

The present embodiments provide a new object type to be used in a content management system for generating viewable presentations of source data. The source data may comprise metadata only or metadata and content data, which content data relates to a content of a document file. The new object type is called as processing instructions, and it comprises different classes, e.g. presentation instructions (PI), stand-alone report (SR), merge report (MR). According to an embodiment, the viewable presentation is an unmodifiable (e.g. read-only) document in certain, fixed format. According to another embodiment, the viewable presentation may comprise editable fields for receiving user input. Mainly the presentations are provided for viewing purposes only, even though some modification from a user is still allowed. The user may view the presentation on a display of a computing device, or the user may print the presentation in paper format. The source data may comprise—in addition to a presentation template—metadata only. According to another embodiment, the source data may also comprise a document file. An example of a viewable presentation is a document in portable document format (PDF), wherein the present embodiments is also about converting a document file (i.e. object related file) and/or document (i.e. object) metadata into a file format that relates to the representation, for example PDF file format.

Figure 4:
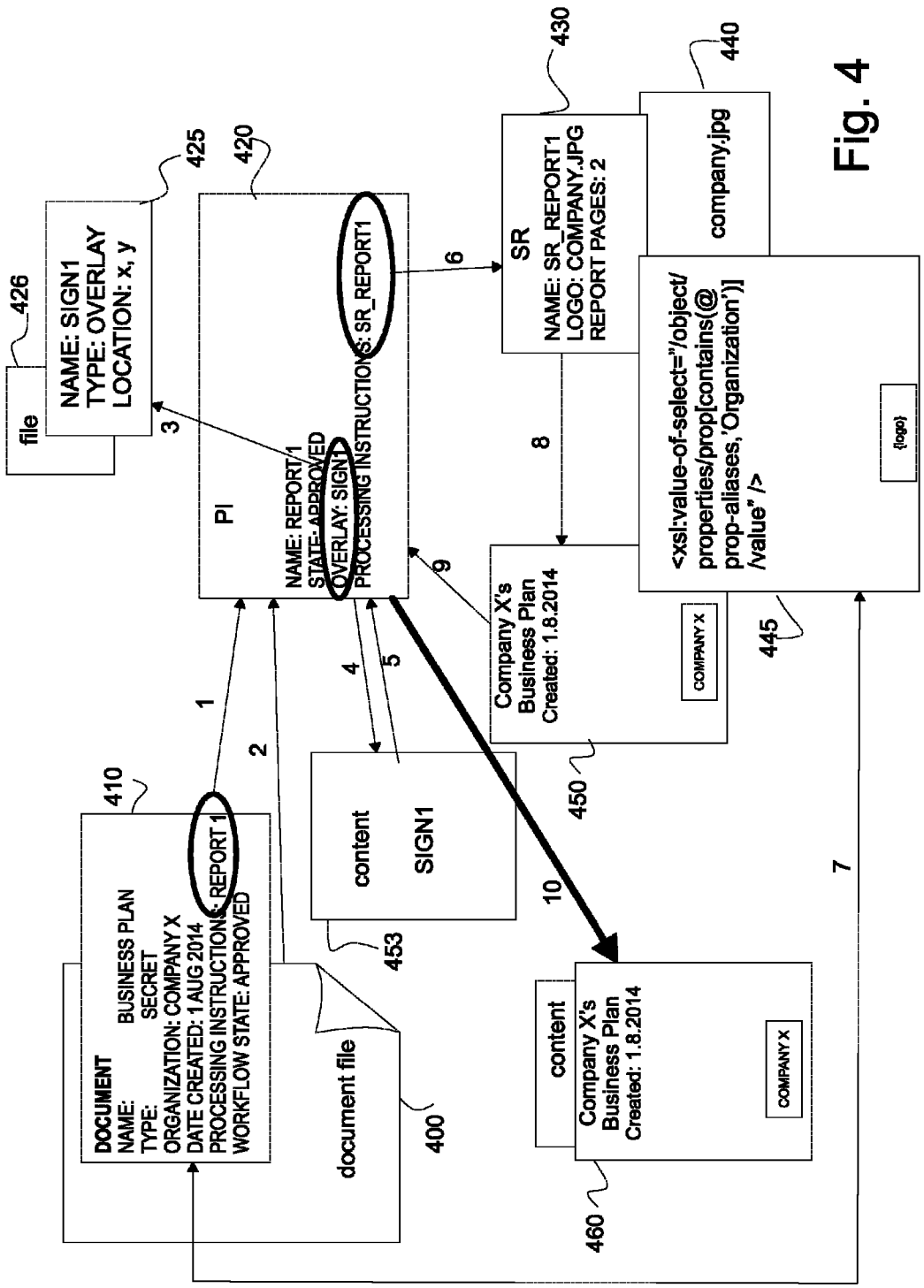
FIG. 4 shows a solution according to a first embodiment.

An embodiment of a solution is illustrated in FIG. 4. FIG. 4 shows a document file 400, which can be a text file (created e.g. by Microsoft Word), a spreadsheet (created e.g. by Microsoft Excel), an image file, a presentation (created e.g. by Microsoft PowerPoint), a diagram (created e.g. by Microsoft Visio), etc. The document file 400 in this example is associated with metadata 410 having metadata properties "Name; Type; Organization; Date created; Processing Instructions; Workflow state" having corresponding values "Business Plan; Secret; Company X; 1 Aug. 2014; Report 1; Approved".

According to this embodiment, the system also comprises processing instructions objects, such as a presentation instructions (PI) 420 and a standalone report (SR) 430. It is appreciated that the system may comprise several PI objects and/or several SR objects for several different reporting events. For example, there can be a PI object for "report 1" and a PI object for "report 2". As in this embodiment, there is a PI object for state "approved", but there can be also a PI object for state "published", a PI object for state "ready to be sent".

In operation, a PI object 420 is executed, when a certain, predefined property value is input to document's metadata 410. Alternatively, the PI object 420 may be executed, when the document's metadata 410 already comprises the certain, predefined property value, but one or more of the other property values are changed. For example, the property may be a workflow state, wherein the certain, predefined value triggering the PI object 420 can be "approved". When such a property value is encountered, a PI object 420 is called. Or if the document's metadata is already in the "Approved" state, but one or more of the other properties is changed (e.g. type is changed from "secret" to "notice"), the PI object 420 may be called.

The correct PI object is specified in the document's metadata 410 (Property "Processing Instructions: report 1"). The value "report 1" is a direct reference (1) to correct PI object 420. If the value for "Processing Instructions" is changed from "report 1" to "report 2", the reference would be changed accordingly to a PI object having a name "report 2" (not shown in FIG. 4).

The PI object 420 is associated with metadata having e.g. properties "Name; State; Overlay; Processing Instructions". The PI object may also comprise other metadata. By means of the "Name" property, a reference to the PI object can be created. By means of the "State" property, it can be defined, which value in "Workflow State" causes the execution of the PI object. "Overlay" is optional and may define if a watermark is inserted to the generated presentation. In this embodiment, the property "Overlay" refers (3) to an overlay object "Sign1" 425 which comprises a file (e.g. an image file) 426 and metadata property defining a location of the watermark in the presentation. The property "Processing Instructions" indicates, if the report defined by the PI object needs metadata, i.e. which SR object is to be executed.

The PI object 420, when executed, is configured to generate a viewable presentation 453 from the document file 400. This means that the PI object 420 is configured to read (2) the document file 400 and execute a program code that converts (4) the document file 400 into a portable document format (PDF) 453. However, this presentation 453 is not the final presentation, because the PI object 420 also needs metadata presentation from SR object 430. This is indicated by the property "Processing Instructions" referring (6) to correct SR object 430.

The purpose of SR object 430 is to generate a viewable presentation of object's metadata. The metadata that is needed by the viewable presentation is defined in a template 445, which may be in a XSLT-file format (Extensible Stylesheet Language Transformations). For the purposes of the XSLT transformation, the used metadata has to be in XML (Extensible Markup Language) format. The metadata can be in the XML format already when associated with the object. Alternatively, the system may convert the object's metadata properties to the XML format. When being in XML format, the data from metadata properties of an object can be obtained to the document template 445 by using XPath expressions. The XPath expression may use a property identification, e.g.
<xsl:value-of select="/object/properties/prop[@id=20/value"/>,
or a text-based alias being defined for a property (as shown in FIG. 4: 445), e.g.
<xsl:value-of select="/object/properties/prop[contains(@prop-aliases, 'Organization')]/value"/>.

Figure 5:
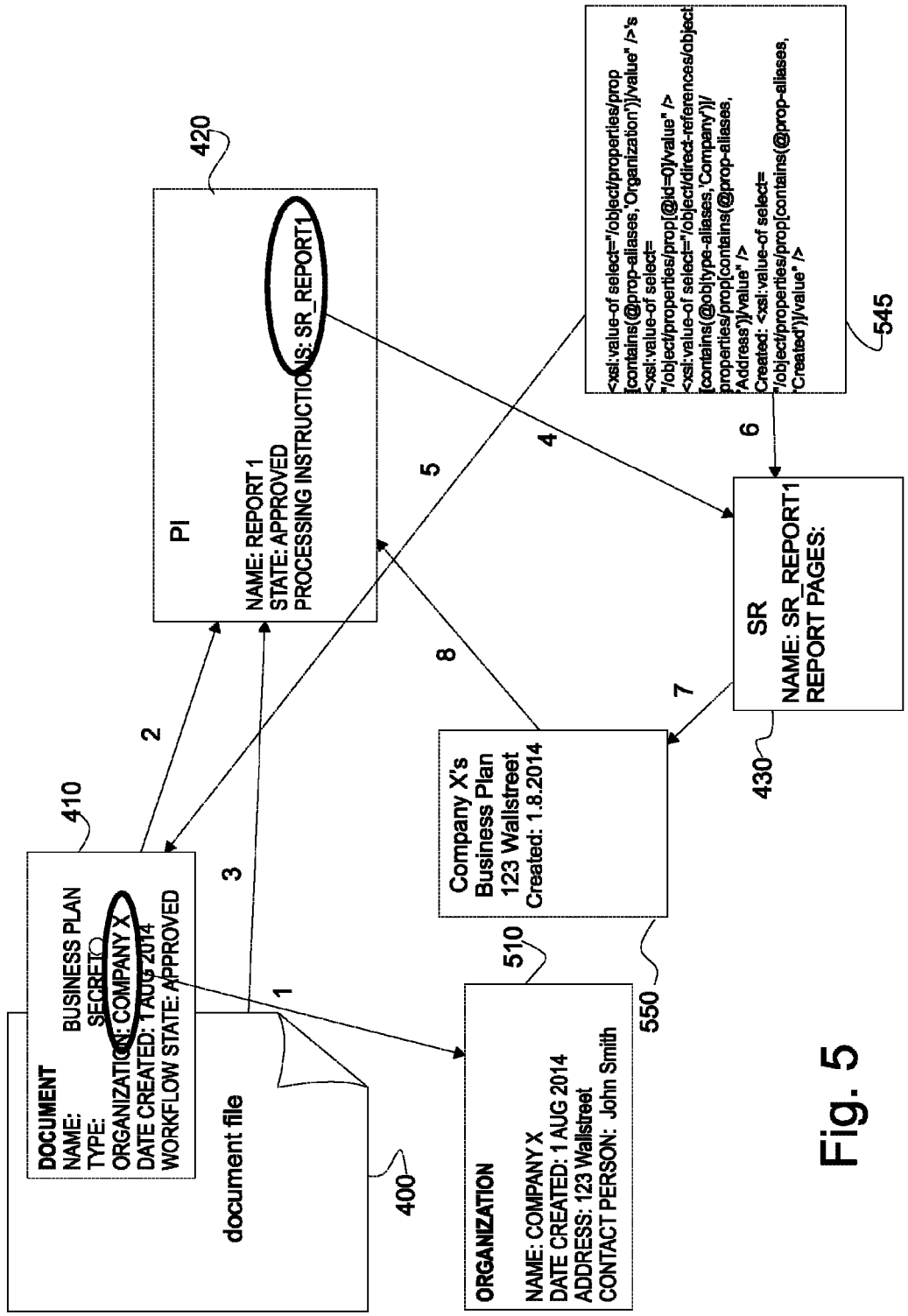
FIG. 5 shows a solution according to a second embodiment.

It is appreciated that alias is not necessarily the same as the property name, but is a general name for properties defining the same content. The template may also use field codes, by means of which the retrieval of metadata property values is made possible. In this example, the metadata values for the template 445 are fetched (7) directly from the document file's metadata 410. The SR object 430 is also configured to determine which other objects or other metadata are/is needed when generating the portable document version of the document file. The other object/metadata may be referred by one or more property values of the document file's metadata 410, or the other object/metadata may be related to the document file's metadata in other way. Such an embodiment is illustrated in FIG. 5, where document file's metadata 410 refers to an object "Organization" 510 having metadata for "Name: Company X"; "Date created: 1 Aug. 2014"; "Address: 123 Wallstreet"; "Contact Person: John Smith".

Let us refer back to FIG. 4. As shown, the SR object 430 may also comprise other files, e.g. an image file 440 "company.jpg", which is used as a logo in the metadata presentation.

By means of the metadata 410 and a template 445, the SR object 430 generates (8) a metadata presentation 450. In practice, this means that SR object 430 is configured to execute a program code that converts the metadata presentation into a portable document format (PDF). The metadata presentation 450 is passed (9) to the PI object 420. The PI object 420 may then use (5) the pages of the content presentation 453 to be combined with the pages of the metadata presentation 450 in order to generate (10) a final presentation 460.

It is noticed that the generated final presentation 460 may comprise several pages, in this embodiment, two pages. The first page of the final presentation 460 comprises the company logo and information that has been retrieved from document file's metadata "Company X", "Business Plan", "1.8.2014". The second page of the generated final document 460 comprises the content of the document file and an overlay.

It is appreciated that in this embodiment, a change in a metadata property value (e.g. workflow state) controls the conversion of a document to PDF format, i.e. generation of the presentation. The presentation in PDF format is generated by using information in the document file's metadata, content in the document file as well as predefined presentation template defined by SR object.

FIG. 5 illustrates another embodiment, where PI object 420 operates as shown in FIG. 4 (FIG. 4: ref's 1, 2, 4, 5, 6) but where the metadata presentation 550 is generated by the SR object 430 by using information also from another object's metadata 510. The organization object "Company X" 510 is referred (1) by a metadata property "Organization" having a value "Company X" in document file's 400 metadata 410. In order to generate a metadata presentation 550, the SR object 430 uses (6) a template 545, having reference (5) to a metadata property Address in Organization object 510. The reference may be in the form of
<xsl:value-of select="/object/direct-references/object[contains(@objtype-aliases,'Company')]/properties/prop[contains(@prop-aliases,'Address')]/value"/>

After having generated (7) the metadata presentation 550, the SR object 430 returns (8) the metadata presentation 550 for the PI object 420 for further use (see FIG. 4 ref. 10).

Figure 6:
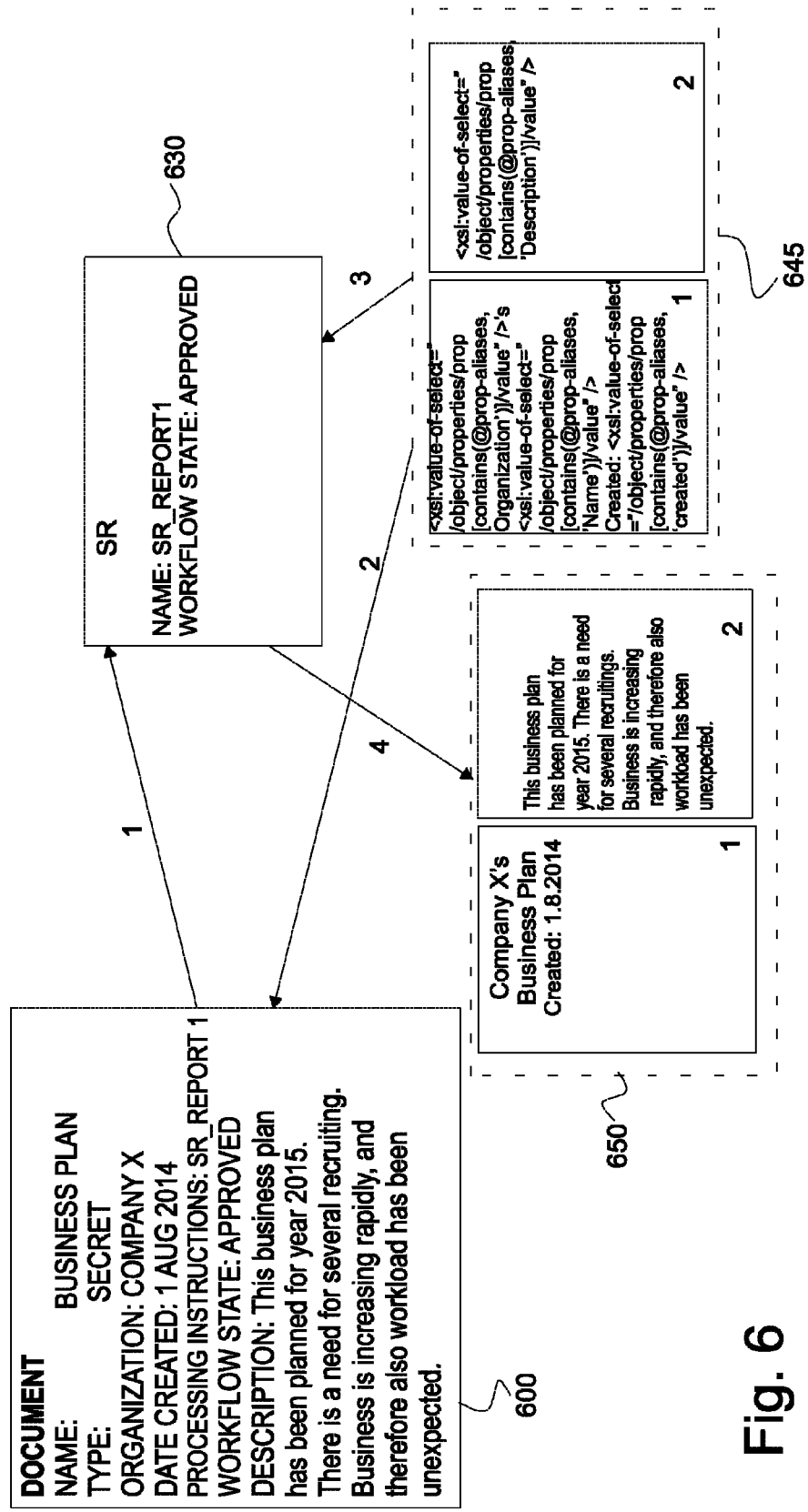
FIG. 6 shows a solution according to a third embodiment.

FIG. 6 illustrates yet another embodiment. As a difference to FIGS. 4 and 5, the system of FIG. 6 lacks the PI object. This is because the presentation 650 being generated is only the metadata presentation, i.e. the presentation is generated by using only the information in the document object's metadata 600. The metadata 600 comprises properties "Name"; "Type"; "Organization"; "Date Created"; "Workflow state"; "Description" having values "Business Plan"; "Secret"; "Company X"; "1 Aug. 2014"; "Approved"; "This business plan has been planned . . . ". It is realized that this embodiment removes the need of using text processing applications in order to generate a letter or other document. All the content data can be specified by a user in corresponding metadata properties 600, and this content data can be fetched to corresponding sections in a document template 645.

Because the solution shown in FIG. 6 does not have the PI object, the SR object 630 is executed by a metadata driven command. The SR object 630 is triggered (1), when a metadata property (e.g. for a workflow state value) is changed to certain value (e.g. "approved"). The presentation generation process begins and a correct SR object 630 (i.e. indicated by the processing instructions property in document's metadata 600) is executed. The SR object 630 fetches (2) data from the object's metadata 600 as specified in a document template 645. When the document template 645 has been filled (3) with a desired metadata values, a presentation 650 is generated (4), i.e. stored in portable document format. The generated document 650 may then be sent by email or may be printed or stored for later use. It is realized that before the generated document 650 the user did not have any document file (e.g. a Microsoft Word file), but used only object metadata to specify the content for the document.

Figure 7:
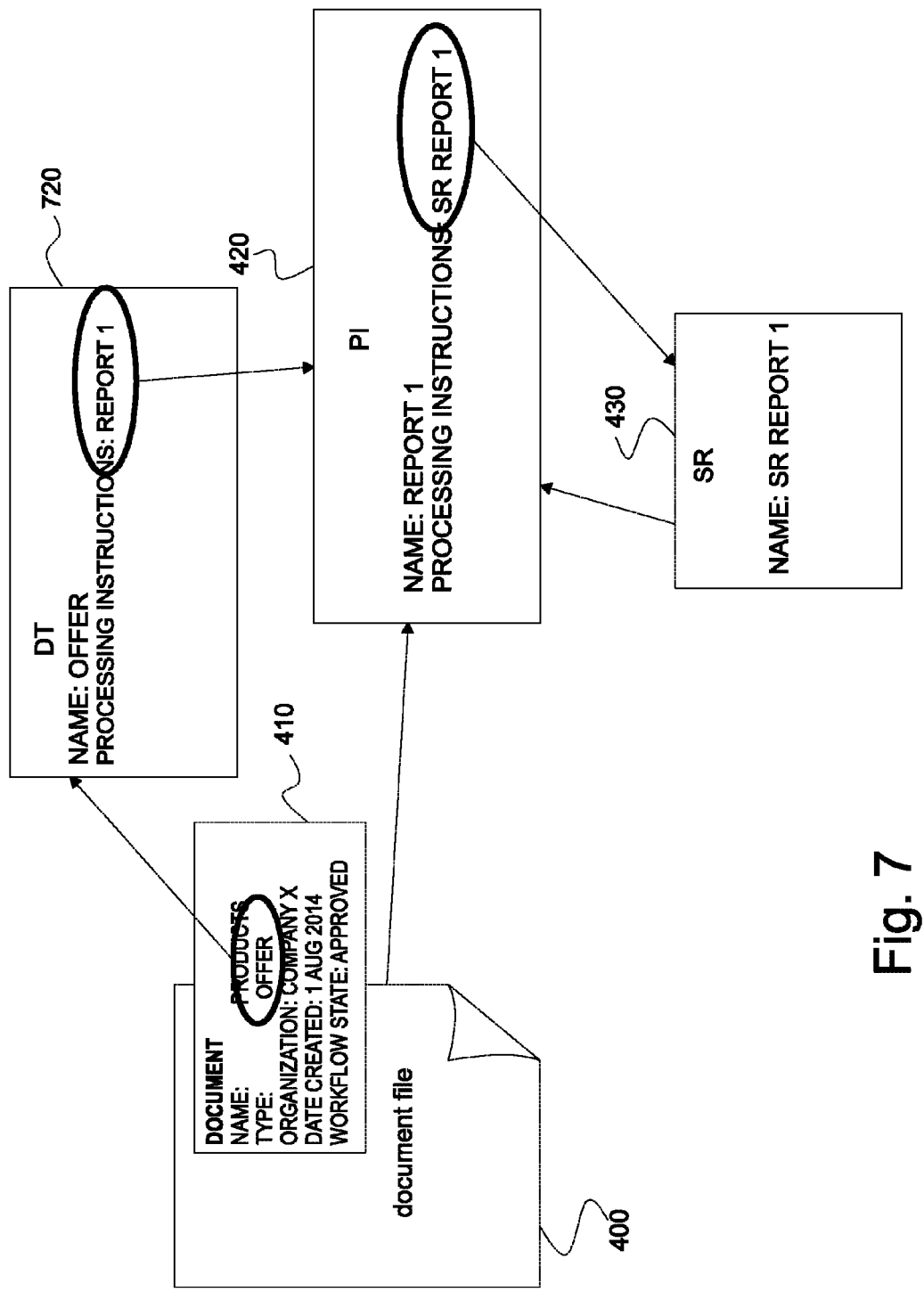
FIG. 7 shows a solution according to a fourth embodiment.

FIG. 7 illustrates yet another embodiment. As a difference to FIGS. 4 and 5, the solution of FIG. 7 also comprise an object DT 720 which corresponds to a certain document type—in this example "Offer". The purpose of the DT object 720 is to act as a reference between the document file (and associated metadata) and PI object 420 and/or SR object 430. This means that when a document 400 is defined to be a certain type of a document, then a corresponding DT object 720 guides to the correct PI object 420 and/or the correct SR object 430. This means that instead of a user defining a certain report into a property "Processing Instructions" in document's metadata, the "Processing Instructions" is a built-in property in the document type object. This makes the execution of a correct PI object (or SR object) invisible to a user, because the user does not have to know to which PI object the referral should be made. The rest of the operation goes like in embodiments shown in FIGS. 4-6. Document type object 720 of this embodiment is an example of an intermediate component that comprises the property "Processing Instructions" instead of defining the property "Processing Instructions" in document object's metadata. Alternatively, the intermediate component can relate to any other metadata property instead of the document type.

In the previous, a standalone report (SR) object was described. The SR object generates one (having one or more sides) metadata presentation (e.g. a PDF document) from object's metadata. According to a yet further embodiment, the system comprises a merge report (MR) object that is configured to generate more than one (having one or more sides) presentation (e.g. a PDF document) from the object's metadata. An example of the operation of the MR object is given next and illustrated in FIG. 8. In this embodiment, the merge presentation is generated from metadata properties without an existing document file. However, it is appreciated that the MR object can replace the SR object in any of the FIGS. 4-7.

Figure 8:
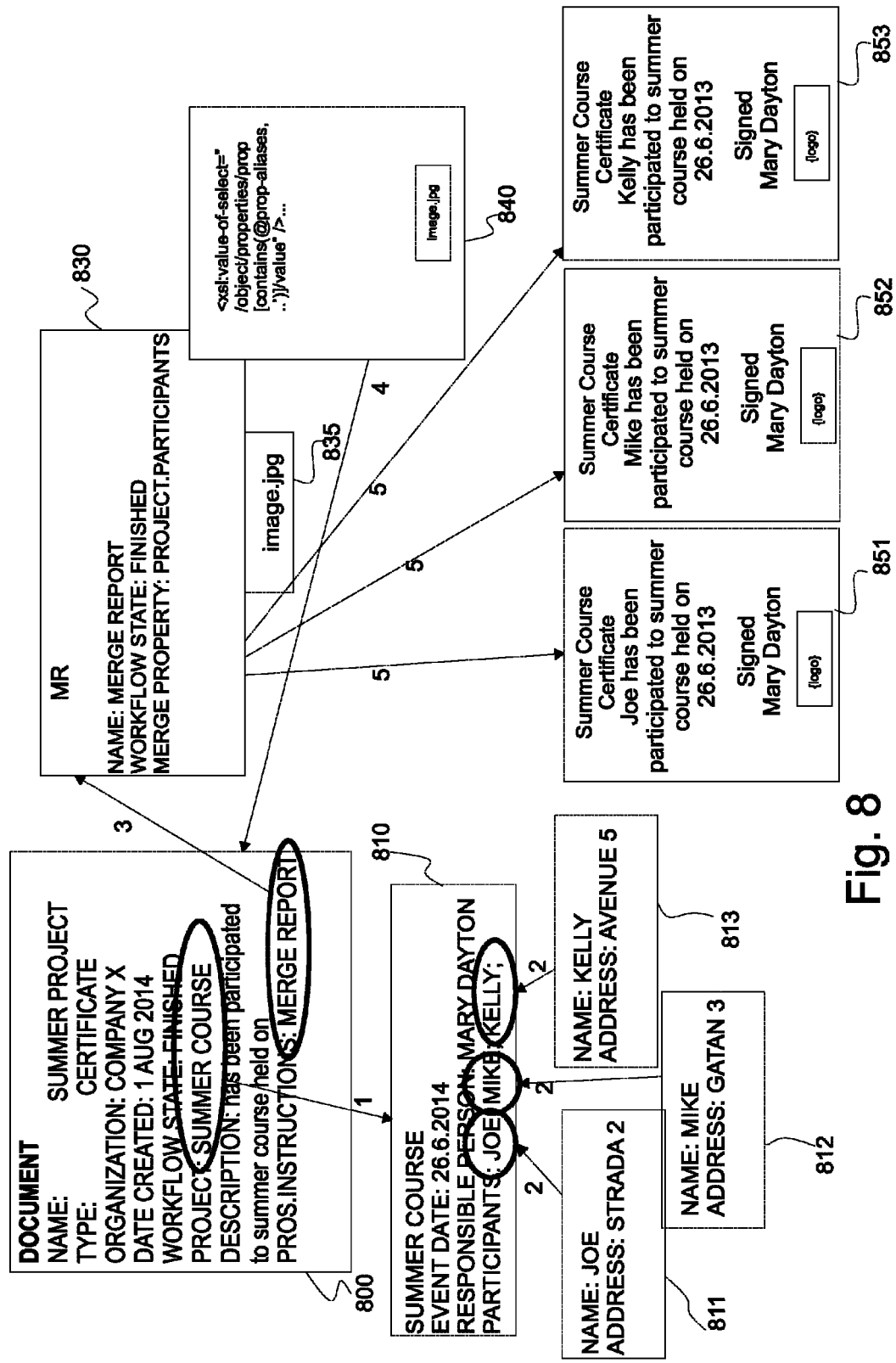
FIG. 8 shows a solution according to a fifth embodiment.

FIG. 8 illustrates an object 800 that is a certificate for a summer course. According to the embodiment, shown in FIG. 8, the object 800 refers to project object "Summer Course" 810 from a corresponding metadata value. The project object 810 has a metadata property "Participants" having values "Joe; Mike; Kelly". These values have been obtained (2) from a corresponding participant objects 811, 812, 813 which all refer to a project "Summer Course" from their respective metadata values.

As an alternative embodiment, not shown in FIG. 8, the property "Participants" having values "Joe; Mike; Kelly" may be located on any other object, including the document object 800 itself.

When a workflow state of the object 800 is changed to "Finished", the system automatically calls (3) MR object 830 to generate a merge report of the object. The correct MR object is defined in a property "Processing instructions". The MR object 830 comprises a report template 840, into which metadata values from respective objects are inserted (4) by means of e.g. Xpath expression. According to this embodiment, the MR object 830 comprises a property "Merge property" having value "Project.Participants", which is an indirect reference from the document object's 800 metadata to the project object 810. This means that the MR object 830 is configured to generate (5) presentations 851, 852, 853 according to each varying value in a metadata property "Participants". This means that the MR object 830 is able to generate as many presentation 851, 852, 853 as there are different values in the metadata property "Participants", wherein each report has a different value in the corresponding location of the template 840. It is appreciated that the varying value can be located in any other metadata property than "Participants" of this embodiment, but the metadata property that is used for generating merge report is indicated in the MR object 830.

In practice the merge report may be achieved by having a variable XML tag identifying the property according to which the merge report may be generated—in this example the property is "Participant" (prop-id=30)—and the number of property value (index=1) in the complete list of values, to which a report is being generated: <merge-property prop-id="n" index="m"/>.

The values are then seen as values of the referred property (i.e. "Participants", in this example) as in earlier embodiments:
<prop id=30>
<value>Joe</value>
<value>Kelly</value>
<value>Mike</value>
</prop>

When the MR object 830 operates with a PI object, then the generated presentations 851, 852, 853 are passed to the PI object for further processing, e.g. to be combined with a converted document file.

In the previous, embodiments for creating presentations from a source data have been disclosed. The object's metadata comprises a property (i.e. processing instructions) that indicates the type of the presentation, i.e. whether any or any combination of the following is executed: PI object, SR object, MR object. The object may be the object for which the presentation is generated. Alternatively, the object may be an object that is referred by the object for which the presentation is generated. The presentation generation is triggered either by a change in a workflow state to a predefined state or (when being in the predefined state) by a change in any other property value. PI object is configured to generate a content presentation in unmodifiable file format from a content of the object file. SR is configured to generate metadata presentation in unmodifiable file format, which metadata presentation uses metadata property value of an object. The content presentation and the metadata presentation may be combined by the PI object to generate a final presentation. Instead of SR object, a MR object may be used.

The method according to an embodiment is illustrated as a flowchart in FIG. 9. According to an embodiment, the method for a content management system storing electronic data as electronic objects, wherein an electronic object is associated with metadata having one or more properties and corresponding values, comprises detecting a change in a property value in the object's metadata to a predefined value 910; determining a presentation type for the object 920; selecting a template for the determined presentation type 930; modifying at least one section of the template with a corresponding property value obtained by utilizing metadata of the object 940; and generating a metadata presentation of the modified template 950. According to another embodiment, the steps 910, 920 are optional, wherein the method comprises determining a presentation template for an electronic object; modifying at least one section of the presentation template with a property value obtained by utilizing metadata of the object; and generating a metadata presentation of the modified presentation template.

The various embodiments of the invention can be implemented with the help of computer program code that resides in a memory and causes the relevant apparatuses to carry out the invention. The computer program product may be embodied on a non-transitory computer readable medium. As an example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method for a content management system storing electronic data as electronic objects, wherein an electronic object is associated with metadata having one or more properties and corresponding values, and wherein at least one of the objects is a processing object for generating electronic documents from source data, said processing object comprising metadata having at least a property having a predefined value; the method comprising:
   a change in a property value in an electronic object metadata other than the processing object's metadata to the predefined value;
   in response to detecting the change, the method further comprising
      determining an instructing object by a property value in the electronic object's metadata, and executing the instructing object to generate a content presentation of a document file being associated with the electronic object;
      determining a processing object that is referred to by a property value of said instructing object's metadata, and executing the processing object to generate a metadata presentation by
         selecting a presentation template according to a metadata value of the determined processing object;
         modifying at least one section of the presentation template with a property value obtained by utilizing metadata of an electronic object other than the processing object; and
         generating a metadata presentation from the modified presentation template; and
      combining the generated content presentation and the metadata presentation in order to generate a final presentation in a form of a portable document format.

2. The method according to claim 1, wherein the property of the processing object having the predefined value is a workflow state.

3. The method according to claim 1, wherein the presentation template is determined from a metadata property of the processing object.

4. The method according to claim 1, wherein the presentation template is determined from a property value of an electronic object that is referred by a property value of the processing object.

5. The method according to claim 1, wherein the metadata of the processing object is utilized for obtaining a property value directly from said processing object's metadata, and modifying a section of the presentation template with the obtained property value.

6. The method according to claim 1, wherein the metadata of the processing object is utilized for obtaining a property value from metadata of an electronic object that is referred by a property value of the processing object, and modifying a section of the presentation template with the obtained property value.

7. The method according to claim 1, wherein the metadata of the processing object is utilized for obtaining more than one property value directly from said processing object's metadata, and modifying several sections of the presentation template with the obtained property values.

8. The method according to claim 1, wherein the metadata of the processing object is utilized for obtaining property values from metadata of more than one electronic object that are referred by a property value of the processing object, and modifying several sections of the presentation template with the obtained property values.

9. An apparatus comprising at least one processor, memory including computer program code and storing electronic data as electronic objects, wherein an electronic object is associated with metadata having one or more properties and corresponding values, and wherein at least one of the objects is a processing object for generating electronic documents from source data, said processing object comprising metadata having at least a property having a predefined value, the memory and the computer program code configured to, with the at least one processor, cause the apparatus to perform at least the following:

detecting a change in a property value in an electronic object metadata other than the processing object's metadata to the predefined value;

in response to detecting the change, the apparatus is caused to determine an instructing object by a property value in the electronic object's metadata, and executing the instructing object to generate a content presentation of a document file being associated with the electronic object;

determine a processing object that is referred to by a property value of said instructing object's metadata, and executing the processing object to generate a metadata presentation by selecting a presentation template according to a metadata value of the determined processing object;

modifying at least one section of the presentation template with a property value obtained by utilizing metadata of an electronic object other than the processing object; and generating a metadata presentation from the modified presentation; and combine the generated content presentation and the metadata presentation in order to generate a final presentation in a form of a portable document format.

10. The apparatus according to claim 9, wherein the property of the processing object having the predefined value is a workflow state.

11. The apparatus according to claim 9, wherein the presentation template is determined from a metadata property of the processing object.

12. The apparatus according to claim 9, wherein the presentation template is determined from a property value of an electronic object that is referred by a property value of the processing object.

13. The apparatus according to claim 9, wherein the metadata of the processing object is utilized for obtaining a property value directly from said processing object's metadata, and modifying a section of the presentation template with the obtained property value.

14. The apparatus according to claim 9, wherein the metadata of the processing object is utilized for obtaining a property value from metadata of an electronic object that is referred by a property value of the processing object, and modifying a section of the presentation template with the obtained property value.

15. The apparatus according to claim 9, wherein the metadata of the processing object is utilized for obtaining more than one property value directly from said processing object's metadata, and modifying several sections of the presentation template with the obtained property values.

16. The apparatus according to claim 9, wherein the metadata of the processing object is utilized for obtaining property values from metadata of more than one electronic object that are referred by a property value of the processing object, and modifying several sections of the presentation template with the obtained property values.

17. A computer program product for a content management system storing electronic data as electronic objects, wherein an electronic object is associated with metadata having one or more properties and corresponding values, and wherein at least one of the objects is a processing object for generating electronic documents from source data, said processing object comprising metadata having at least a property having a predefined value, wherein the computer program product is embodied on a non-transitory computer readable medium, comprising computer program code configured to, when executed on at least one processor, cause an apparatus or a system to:

detect a change in a property value in an electronic object metadata other than the processing object's metadata to a predefined value;

in response to detecting a change, the apparatus or the system is further caused to determine an instructing object by a property value in the electronic object's metadata, and executing the instructing object to generate a content presentation of a document file being associated with the electronic object;

determine a processing object that is referred to by a property value of said instructing object's metadata, and executing the processing object to generate a metadata presentation by selecting a presentation template according to a metadata value of the determined processing object;

modifying at least one section of the presentation template with a property value obtained by utilizing metadata of an electronic object other than the processing object; and generating a metadata presentation from the modified presentation template; and combine the generated content presentation and the metadata presentation in order to generate a final presentation in a form of a portable document format.

\* \* \* \* \*

UNITED STATES PATENT AND TRADEMARK OFFICE
CERTIFICATE OF CORRECTION

PATENT NO.         : 9,864,733 B2
APPLICATION NO.    : 14/560059
DATED              : January 9, 2018
INVENTOR(S)        : Timo Hyrsyla et al.

Page 1 of 1

It is certified that error appears in the above-identified patent and that said Letters Patent is hereby corrected as shown below:

In Column 10, Claim 1, at Line 9, please insert the word --detecting-- prior to the phrase "a change".

Signed and Sealed this
First Day of May, 2018

Andrei Iancu
*Director of the United States Patent and Trademark Office*